US012744337B2

(12) United States Patent
Cui et al.

(10) Patent No.: US 12,744,337 B2
(45) Date of Patent: Sep. 22, 2026

(54) STRUCTURE FOR CHANGING AN INNER DIAMETER OF A CIRCULAR TERMINAL

(71) Applicant: Shenzhen Tuozheng Technology Co., Ltd., Shenzhen (CN)

(72) Inventors: Zhanke Cui, Shenzhen (CN); Kelei Cui, Xinyi (CN)

(73) Assignee: Shenzhen Tuozheng Technology Co., Ltd., Shenzhen (CN)

( * ) Notice: Subject to any disclaimer, the term of this patent is extended or adjusted under 35 U.S.C. 154(b) by 338 days.

(21) Appl. No.: 18/406,299

(22) Filed: Jan. 8, 2024

(65) Prior Publication Data

US 2024/0339771 A1 Oct. 10, 2024

(30) Foreign Application Priority Data

Apr. 4, 2023 (CN) ......................... 202320723777.5

(51) Int. Cl.
*H01R 11/11* (2006.01)
*H01R 4/40* (2006.01)
*H01R 11/28* (2006.01)

(52) U.S. Cl.
CPC ............. *H01R 11/285* (2013.01); *H01R 4/40* (2013.01)

(58) Field of Classification Search
CPC ........ H01R 11/285; H01R 4/40; H01R 11/05; H01R 11/12
See application file for complete search history.

(56) References Cited

U.S. PATENT DOCUMENTS

| | | | | |
|---|---|---|---|---|
| 3,704,440 A * | 11/1972 | Bradley | H01R 11/281 | 439/519 |
| 5,664,971 A * | 9/1997 | Coy | H01R 4/363 | 439/957 |
| 5,897,406 A * | 4/1999 | Benes | H01R 11/22 | 439/859 |
| 6,250,973 B1 * | 6/2001 | Lowery | H01R 11/281 | 439/763 |
| 6,932,650 B1 * | 8/2005 | Freitag | H01R 13/68 | 439/761 |
| 7,828,613 B2 * | 11/2010 | Chen | H01R 11/12 | 439/883 |
| 2005/0228500 A1 * | 10/2005 | Kim | A61F 2/4611 | 623/17.13 |
| 2006/0003627 A1 * | 1/2006 | Freitag | H01R 13/68 | 439/504 |
| 2008/0038948 A1 * | 2/2008 | Kim | H01R 13/443 | 439/148 |
| 2008/0065222 A1 * | 3/2008 | Hamada | A61F 2/4657 | 623/17.11 |
| 2011/0287644 A1 * | 11/2011 | Kuwahara | H01M 50/522 | 439/110 |
| 2013/0210292 A1 * | 8/2013 | Schmidt | H01R 4/06 | 439/775 |
| 2022/0131282 A1 * | 4/2022 | Porte | H01R 4/185 | |

* cited by examiner

*Primary Examiner* — Abdullah A Riyami
*Assistant Examiner* — Nelson R. Burgos-Guntin

(57) ABSTRACT

A structure for changing an inner diameter of a circular terminal is disclosed, including spacers. The spacers have an outer diameter consistent with an outer diameter of a terminal matching with the spacers, the spacers are configured to be circumferentially distributed with clamping mechanisms, a circle formed around two groups of the clamping mechanisms has a diameter consistent with an inner diameter of the terminal. The spacers are further configured with connecting holes for matching with a binding post.

4 Claims, 2 Drawing Sheets

STRUCTURE FOR CHANGING AN INNER DIAMETER OF A CIRCULAR TERMINAL

TECHNICAL FIELD

The present application relates to the technical field of wire connection, and specifically to a structure for changing an inner diameter of a circular terminal.

BACKGROUND

Each of existing terminals available on the market has its own separate fixed inner diameter, and binding posts also have different outer diameters, which leads to use of the terminals in conjunction with the binding posts is more restricted. If binding posts having inappropriate outer diameters are encountered during use, many situations will occur, such as the out diameter of the binding posts is too thick to fit with the terminals, the outer diameter of the binding posts is too thin so that it is easy to loosen connections with the therminals, or the binding posts and the terminals can not be pressed tightly or directly pressed and so on, which is easy to cause poor contact between the terminals and the binding posts, thereby damaging an electrical device or causing electrical hazards.

For professionals, through professional tools may cut off an original terminal, so as to replace it with a new terminal suitable for the binding post to solve connection problems. But for non-professionals, may not solve corresponding problems through above methods, only through re-purchase of new wires suitable for connecting the terminal to solve the corresponding problems. Such operation is more inconvenient and increases the cost of connecting the terminal and the binding post.

Therefore, in view of above situations, there is an urgent need to develop a structure that can change the inner diameter of circular terminals to overcome shortcomings of current practical applications.

SUMMARY

The present disclosure aims to provide a structure for changing an inner diameter of a circular terminal to address problems mentioned in the background.

To realize above objectives, the present proposes following technical solutions. In some embodiments of the present disclosure, a structure for changing an inner diameter of a circular terminal is provided, including spacers. The spacers have an outer diameter consistent with an outer diameter of a terminal matching with the spacers, the spacers are configured to be circumferentially distributed with clamping mechanisms, a circle formed around multi-groups of the clamping mechanisms has a diameter consistent with an inner diameter of the terminal. The spacers are further configured with connecting holes for matching with a binding post, and two sets of the spacers are connected to the terminal via the clamping mechanisms to be as a whole and then connected to the binding post.

In some preferred embodiments of the present disclosure, the clamping mechanisms include mounting holes and clamping pieces, the mounting holes are circumferentially distributed in the spacers, and the clamping pieces are configured within the mounting holes.

In some preferred embodiments of the present disclosure, the mounting holes and the clamping pieces are formed as an integrated structure by means of stamping equipment stamped onto the spacers.

In some preferred embodiments of the present disclosure, the clamping pieces have Z-shaped sheet structures.

In some preferred embodiments of the present disclosure, the connecting holes are eccentrically opened on the spacers, and centers of the connecting holes are not concentric with centers of the spacers and the clamping mechanisms.

Compared with existing technologies, the present disclosure has at least following advantages.

The spacers have the same outer diameter as that of the terminal to be matched, and the diameter of the connecting holes is made into a diameter to be used. Four groups of the clamping mechanisms are stamped in a position that a circle between the inner diameter and outer diameter, and the diameter of the circle formed around the four groups of the clamping mechanisms is the same as the inner diameter of the terminal to be matched.

In use, a set of the spacers with eccentric connecting holes can be adapted to binding posts having a certain range of small diameter. If binding posts having a wider range of different diameters is required, two sets of the spacers with the connecting holes of different diameters can be provided for connecting to the binding posts.

In use, two spacers are placed opposite each other and clamped to the terminal, the clamping mechanisms on the two spacers are extended to the inner diameter of the terminal. The two spacers rotate to each other in opposite directions, so that the mounting holes and the clamping pieces thereon are locked with each other, thus making the two spacers lock with each other. While when the two spacers rotate with each other, the connecting holes eccentric opened thereon are also driven to rotate. Two groups of the connecting holes rotate through eccentricity, making an original connection inner diameter of the terminal can be changed, thus a space between the two groups of the connecting holes can be easily matched with the binding posts having the small diameter, which can avoid unstable connection situations between the terminal and the binding posts. By providing several sets of the spacers with connecting holes having different diameters, it can be adapted to the binding posts having the wider range of different diameters, thereby improving scope of application and ease of use of the product. This method is less costly and does not require any changes to an original product structure, and allows for a fast and stable connection between the terminal and the binding posts.

Figure 1:
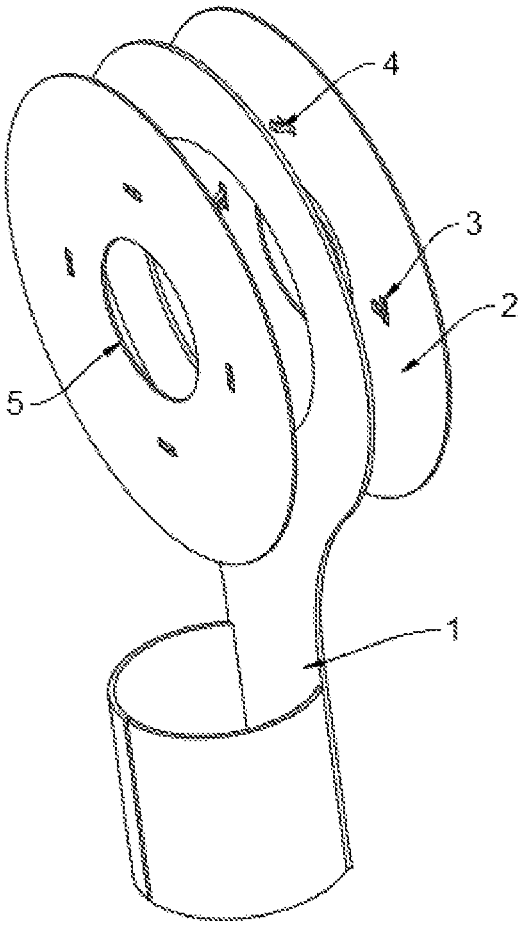
FIG. 1 shows a connection schematic diagram of a structure for changing an inner diameter of a circular terminal, and a terminal in accordance with some embodiments of the present disclosure.

In the drawings, reference signs are as follows. 1. terminal, 2. spacer, 3. mounting hole, 4. clamping piece, 5. connecting hole.

DETAILED DESCRIPTION OF THE EMBODIMENTS

The technical solutions in the embodiments of the present disclosure will be described clearly and completely in conjunction with accompanying drawings in the embodiments, and it is obvious that described embodiments are only a part of embodiments of the present disclosure, and not all of the embodiments. Based on the embodiments of the present disclosure described below, all other embodiments obtained by a person of ordinary skill in the art without making creative labor are within the scope of protection of the present invention.

Specifically, the technical solutions of the present disclosure are described in further detail below in connection with specific embodiments.

Figure 2:
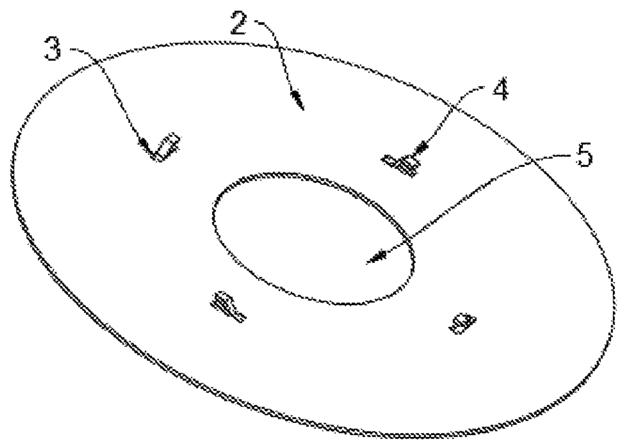
FIG. 2 shows a schematic diagram of a structure for changing an inner diameter of a circular terminal in accordance with some embodiments of the present disclosure.

Referring to FIG. 1 and FIG. 2, in some embodiments of the present disclosure, a structure for changing an inner diameter of a circular terminal is provided, including spacers 2. The spacers 2 have an outer diameter consistent with an outer diameter of a terminal 1 matching with the spacers 2, the spacers 2 are configured to be circumferentially distributed with clamping mechanisms, a circle formed around multi-groups of the clamping mechanisms has a diameter consistent with an inner diameter of the terminal 1. The spacers 2 are further configured with connecting holes 5 for matching with a binding post, and two sets of the spacers 2 are connected to the terminal 1 via the clamping mechanisms to be as a whole and then connected to the binding post.

In the embodiments of the present disclosure, two sets of the spacers 2 through the clamping mechanisms and connecting holes 5 opened thereon, an original connection inner diameter of the terminal can be changed, so that the terminal 1 can be quickly and stable connected to binding posts having different diameters. It can solve problems that the inner diameter of terminals on existing finished electrical appliances in the market or wires or other products is fixed and inconvenient to use, thereby improving scope of application and ease of use of the product.

Referring to FIG. 1 and FIG. 2 again, in some preferred embodiments of the present disclosure, the clamping mechanisms include mounting holes 3 and clamping pieces 4, the mounting holes 3 are circumferentially distributed in the spacers 2, and the clamping pieces 4 are configured within the mounting holes 3.

Referring to FIG. 1 and FIG. 2 again, in some preferred embodiments of the present disclosure, the mounting holes 3 and the clamping pieces 4 are formed as an integrated structure by means of stamping equipment stamped onto the spacers 2.

Referring to FIG. 1 and FIG. 2 again, in some preferred embodiments of the present disclosure, the clamping pieces 4 have Z-shaped sheet structures.

Referring to FIG. 1 and FIG. 2 again, in some preferred embodiments of the present disclosure, the connecting holes 5 are eccentrically opened on the spacers 2, and centers of the connecting holes 5 are not concentric with centers of the spacers 2 and the clamping mechanisms.

In the embodiments of the present disclosure, the outer diameter of the spacers 2 is the same as the outer diameter of the terminal 1 to be matched, and the diameter of the connecting holes 5 is made into a diameter to be used. Four groups of the clamping mechanisms are stamped in a position that a circle between the inner diameter and outer diameter, and the diameter of the circle formed around the four groups of the clamping mechanisms is the same as the inner diameter of the terminal 1 to be matched.

In use, a set of the spacers 2 with eccentric connecting holes can be adapted to binding posts having a certain range of small diameter. If binding posts having a wider range of different diameters is required, two sets of the spacers 2 with the connecting holes 5 of different diameters can be provided for connecting to the binding posts.

Two spacers 2 are placed opposite each other and clamped to the terminal 1, the clamping mechanisms on the two spacers 2 are extended to the inner diameter of the terminal 1. The two spacers 2 rotate to each other in opposite directions, so that the mounting holes 3 and the clamping pieces 4 thereon are locked with each other, thus making the two spacers 2 lock with each other. While when the two spacers 2 rotate with each other, the connecting holes 5 eccentric opened thereon are also driven to rotate. Two groups of the connecting holes 5 rotate through eccentricity, making the original connection inner diameter of the terminal 1 can be changed, thus a space between the two groups of the connecting holes 5 can be easily matched with the binding posts having the small diameter, which can avoid unstable connection situations between the terminal 1 and the binding posts. By providing several sets of the spacers 2 with connecting holes 5 having different diameters, it can be adapted to the binding posts having the wider range of different diameters, thereby improving scope of application and ease of use of the product. This method is less costly and does not require any changes to an original product structure, and allows for a fast and stable connection between the terminal and the binding posts.

In addition, it should be understood that, although this specification is described in accordance with the embodiments, no each embodiment contains only one independent technical solution, and this description of the specification is only for the sake of clarity, and the person of ordinary skill in the art should take the specification as a whole, and the technical solutions in the embodiments can be combined appropriately to form other embodiments that can be understood by the person of ordinary skill in the art.

What is claimed is:

1. A structure for changing an inner diameter of a circular terminal, comprising: spacers, wherein the spacers have an outer diameter consistent with an outer diameter of a terminal matching with the spacers, the spacers are configured to be circumferentially distributed with clamping mechanisms, a circle formed around multi-groups of the clamping mechanisms has a diameter consistent with an inner diameter of the terminal; and the spacers are further configured with connecting holes for matching with a binding post, and two sets of the spacers are connected to the terminal via the clamping mechanisms to be as a whole and then connected to the binding post;

wherein the clamping mechanisms comprise mounting holes and clamping pieces, wherein the clamping pieces have Z-shaped sheet structures.

2. The structure for changing the inner diameter of the circular terminal according to claim 1, wherein the mounting holes are circumferentially distributed in the spacers, and the clamping pieces are configured within the mounting holes.

3. The structure for changing the inner diameter of the circular terminal according to claim 2, wherein the mounting holes and the clamping pieces are formed as an integrated structure by means of stamping equipment stamped onto the spacers.

4. The structure for changing the inner diameter of the circular terminal according to claim 1, wherein the connecting holes are eccentrically opened on the spacers, and centers of the connecting holes are not concentric with centers of the spacers and the clamping mechanisms.

* * * * *